US011825094B2

(12) United States Patent
Byun et al.

(10) Patent No.: US 11,825,094 B2
(45) Date of Patent: Nov. 21, 2023

(54) SYSTEM-ON-CHIP HAVING A MERGED FRAME RATE CONVERTER AND VIDEO CODEC AND FRAME RATE CONVERTING METHOD THEREOF

(71) Applicant: Samsung Electronics Co., Ltd., Suwon-si (KR)

(72) Inventors: Juwon Byun, Hwaseong-si (KR); Jeehoon An, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 17/408,589

(22) Filed: Aug. 23, 2021

(65) Prior Publication Data
US 2021/0385458 A1 Dec. 9, 2021

Related U.S. Application Data

(63) Continuation of application No. 16/516,379, filed on Jul. 19, 2019, now Pat. No. 11,109,033.

(30) Foreign Application Priority Data

Nov. 21, 2018 (KR) ........................ 10-2018-0144616

(51) Int. Cl.
*H04N 19/132* (2014.01)
*H04N 19/86* (2014.01)
(Continued)

(52) U.S. Cl.
CPC ......... *H04N 19/132* (2014.11); *H04N 19/117* (2014.11); *H04N 19/139* (2014.11);
(Continued)

(58) Field of Classification Search
CPC .... H04N 19/132; H04N 19/86; H04N 19/172; H04N 19/117; H04N 19/139; H04N 19/513; H04N 19/44
See application file for complete search history.

(56) References Cited

U.S. PATENT DOCUMENTS 6,307,560 B1   10/2001  Kondo et al.
8,045,615 B2 * 10/2011  Liang ..................... H04N 19/42
                                                              375/240.03
(Continued)

FOREIGN PATENT DOCUMENTS

KR   101016168 B1   2/2011
KR   101056096 B1   8/2011
(Continued)

OTHER PUBLICATIONS

Kaiming He et al., Guided Image Filtering, IEEE Transactions on Pattern Analysis and Machine Intelligence, vol. 35, No. 6, Jun. 2013, pp. 1397-1409 (13 pages).

*Primary Examiner* — Jared Walker
(74) *Attorney, Agent, or Firm* — Muir Patent Law, PLLC

(57) ABSTRACT

A system-on-chip which includes a video codec including a deblocking filter includes a motion estimator that calculates a motion vector of an input image, a motion compensator that compensates for a motion of the input image by using the motion vector, and a parameter generator that allows image data, in which the motion is compensated, to be transferred to and filtered by the deblocking filter of the video codec.

9 Claims, 14 Drawing Sheets

(51) Int. Cl.
*H04N 19/172* (2014.01)
*H04N 19/117* (2014.01)
*H04N 19/139* (2014.01)
*H04N 19/513* (2014.01)

(52) U.S. Cl.
CPC ......... *H04N 19/172* (2014.11); *H04N 19/513* (2014.11); *H04N 19/86* (2014.11)

(56) References Cited

U.S. PATENT DOCUMENTS

| | | | |
|---|---|---|---|
| 8,374,246 B2 | 2/2013 | Raveendran et al. | |
| 8,612,859 B2 | 12/2013 | Maymudes et al. | |
| 2006/0115002 A1* | 6/2006 | Kim | G06T 5/20 375/240.18 |
| 2006/0268985 A1* | 11/2006 | Liang | H04N 19/82 348/415.1 |
| 2008/0018506 A1* | 1/2008 | Raveendran | H04N 19/117 375/E7.181 |
| 2008/0298472 A1* | 12/2008 | Jain | H04N 19/176 375/E7.189 |
| 2010/0046623 A1 | 2/2010 | Chen et al. | |
| 2011/0234894 A1* | 9/2011 | Van Eggelen | H04N 19/156 348/E7.003 |
| 2012/0328200 A1* | 12/2012 | Liu | H04N 19/132 382/199 |
| 2013/0088503 A1* | 4/2013 | Park | H04N 7/0127 345/545 |
| 2013/0212216 A1* | 8/2013 | Mao | H04L 67/02 709/217 |
| 2013/0279590 A1* | 10/2013 | Chen | H04N 19/513 375/240.16 |
| 2015/0365703 A1* | 12/2015 | Puri | H04N 19/46 375/240.24 |
| 2016/0112710 A1* | 4/2016 | Park | H04N 19/16 375/240.25 |
| 2016/0360226 A1* | 12/2016 | Fishwick | H04N 19/553 |
| 2017/0104993 A1* | 4/2017 | Jeong | H04N 19/154 |
| 2018/0041767 A1 | 2/2018 | Yoshikawa et al. | |
| 2018/0160117 A1 | 6/2018 | Mukherjee et al. | |
| 2018/0199065 A1 | 7/2018 | Adams et al. | |

FOREIGN PATENT DOCUMENTS

| | | |
|---|---|---|
| KR | 101740124 B1 | 6/2017 |
| KR | 20170095671 A | 8/2017 |
| KR | 101852967 B1 | 6/2018 |

\* cited by examiner

SYSTEM-ON-CHIP HAVING A MERGED FRAME RATE CONVERTER AND VIDEO CODEC AND FRAME RATE CONVERTING METHOD THEREOF

CROSS-REFERENCE TO RELATED APPLICATIONS

This application is a continuation of U.S. patent application Ser. No. 16/516,379, filed Jul. 19, 2019, in the U.S. Patent and Trademark Office, which claims priority under 35 U.S.C. § 119 to Korean Patent Application No. 10-2018-0144616, filed on Nov. 21, 2018, in the Korean Intellectual Property Office, the entire disclosures of both of which are incorporated by reference herein.

BACKGROUND

Embodiments of the inventive concept described herein relate to an electronic device, and more particularly, relate to a system-on-chip having a video codec merged with a frame rate converter and a frame rate converting method thereof.

A demand for high-definition video services with high resolution, high frame rate, and high bit-depth is increasing day by day. The importance of a codec for efficiently encoding/decoding the huge amount of video data is increasing. In addition, a component such as a frame rate converter (hereinafter referred to as "FRC") for image processing is included as an essential component of a mobile device for the purpose of satisfying demand for the quality of service.

Nowadays, an application processor mounted on the mobile device includes components for supporting various multimedia services. For example, one application processor includes various hardware components, such as a video codec for supporting high-definition and high-quality video service, a frame rate converter, an accelerator, a display controller, and a user interface, in addition to a multi-core processor. However, the size of the components is increasing for the purpose of satisfying demand for an increasing high-definition and high-frame rate service. Accordingly, there is required a technology for minimizing an increase in costs while satisfying a demand for the quality of service.

SUMMARY

Embodiments of the inventive concept provide a video codec merged with a frame rate converter and a frame rate converting method thereof.

According to example embodiments, the disclosure is directed to a system-on-chip which includes a video codec including a deblocking filter, comprising: a motion estimator configured to calculate a motion vector of an input image; a motion compensator configured to compensate for a motion of the input image by using the motion vector; and a parameter generator configured to allow image data, in which motion is compensated, to be transferred to and filtered by the deblocking filter of the video codec.

According to example embodiments, the disclosure is directed to a frame rate converting method of a system-on-chip which includes a video codec, the method comprising: comparing a first frame and a second frame to calculate a motion vector; generating at least one interpolation frame to be inserted between the first frame and the second frame by using the motion vector; calculating a filter level and a number of filter taps of a deblocking filter included in the video codec by using the motion vector and the first and second frames; and removing a blocking noise of an image including the at least one interpolation frame depending on the filter level and the number of filter taps.

According to example embodiments, the disclosure is directed to a system-on-chip comprising: a processor; a frame rate converter (FRC) merged codec configured to generate an output image by performing frame rate conversion on an input image in an FRC mode to obtain a frame rate converted input image and decoding on an input bit stream in a codec mode under control of the processor; and a display controller configured to display the frame rate converted input image or the output image in a display.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, example embodiments of the inventive concept will be described in detail with reference to the attached drawings. Like numbers refer to like elements throughout. In the specification below, an "image" has a comprehensive meaning comprising a moving image such as a video, as well as a still image such as a picture.

Figure 1:
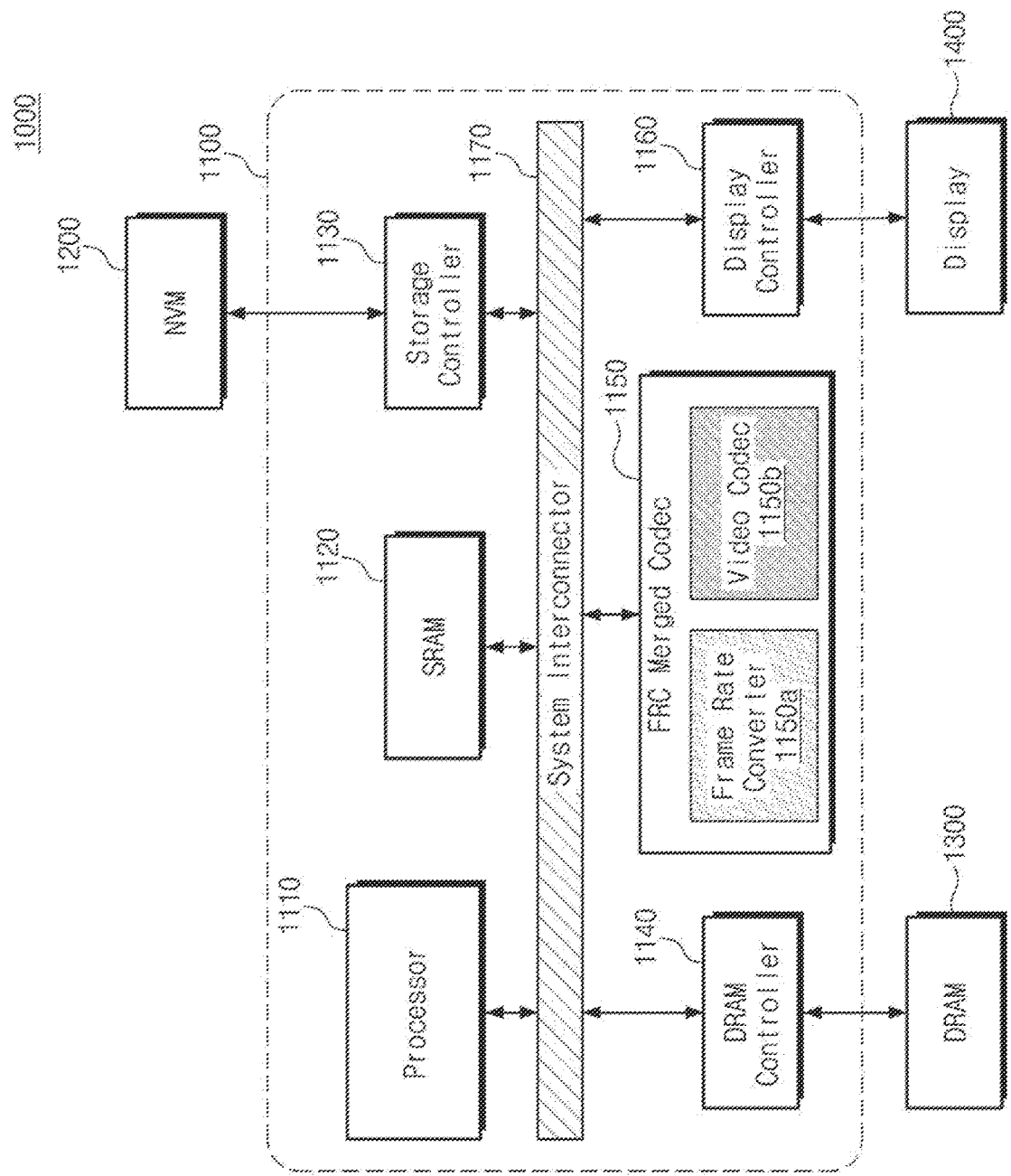
FIG. 1 is a block diagram illustrating a mobile device, according to an example embodiment of the inventive concept.

FIG. 1 is a block diagram illustrating a mobile device according to an example embodiment of the inventive concept. Referring to FIG. 1, a mobile device 1000 may include a system-on-chip (SoC) 1100, a nonvolatile memory (NVM) device 1200, a dynamic random access memory (DRAM) 1300, and a display 1400. The system-on-chip 1100 may include a processor 1110, a static RAM (SRAM) 1120, a storage controller 1130, a DRAM controller 1140, a FRC merged codec 1150, and a display controller 1160. However, it should be appreciated that components of the mobile device 1000 are not limited to the components illustrated in FIG. 1. For example, the mobile device 1000 or the system-on-chip 1100 may further include an accelerator, a user interface, a security block, etc.

The processor 1110 executes software (e.g., an application program, an operating system, and/or device drivers) of the mobile device 1000. The processor 1110 may execute an operating system (OS) loaded onto the DRAM 1300. The processor 1110 may execute various application programs to be driven based on the operating system. The processor 1110 may be implemented with a homogeneous multi-core processor or a heterogeneous multi-core processor.

The SRAM 1120 may be used as an internal working memory of the system-on-chip 1100. In any embodiment, a code to be executed by the processor 1110 may be loaded onto the SRAM 1120. In some embodiments, a secure operating system may be loaded onto the SRAM 1120.

The storage controller 1130 accesses the nonvolatile memory device 1200 in response to a request of the processor 1110. For example, the storage controller 1130 provides an interface between the system-on-chip 1100 and the nonvolatile memory device 1200. For example, data processed by the processor 1110 may be stored in the nonvolatile memory device 1200 through the storage controller 1130. For another example, data stored in the nonvolatile memory device 1200 may be provided to the DRAM 1300 or the processor 1110 through the storage controller 1130.

The DRAM controller 1140 provides interfacing between the DRAM 1300 and the system-on-chip 1100. The DRAM controller 1140 may access the DRAM 1300 in response to a request of the processor 1110 or any other intellectual property (IP). For example, the DRAM controller 1140 may write data in the DRAM 1300 in response to a write request of the processor 1110. Alternatively, the DRAM controller 1140 may read data from the DRAM 1300 in response to a read request of the processor 1110 and may transmit the read data to the processor 1110 or the storage controller 1130 through a system interconnector 1170.

As used herein, intellectual property (IP) may also be referred to as intellectual property cores, and may be used to denote a self-contained discrete unit that provides a macro function to the system. Those skilled in the art will appreciate that the disclosed intellectual property or intellectual property cores are physically implemented by electronic (or optical) circuits, such as logic circuits, discrete components, microprocessors, hard-wired circuits, memory elements, wiring connections, buses, communication links, and the like, which may be formed using semiconductor-based fabrication techniques or other manufacturing technologies.

The FRC merged codec 1150 has a structure capable of processing both a frame rate converting function and a video codec function. In general, to display a smooth image in the display 1400, a frame rate of an image to be displayed may be optimized for the display 1400. In addition, the conversion of the frame rate may be performed in cooperation between a frame rate converter 1150a and a video codec 1150b of the FRC merged codec 1150. In addition, the video codec 1150b included in the FRC merged codec 1150 encodes or decodes video data in compliance with an applied standard. The frame rate converter 1150a may use a portion of the components included in the video codec 1150b. For example, the frame rate converter 1150a may perform post-processing of a frame rate converting operation by using a deblocking filter of the video codec 1150b. In another embodiment, the frame rate converter 1150a may perform post-processing of a frame rate converting operation by using a deblocking filter and a self-guided filter of the video codec 1150b. Accordingly, by sharing an intellectual property of a video codec, which overlaps a component used in converting a frame rate, with the video codec 1150b, a circuit or chip area occupied by the frame rate converter 1150a may decrease.

Here, the frame rate converter 1150a and the video codec 1150b may constitute one intellectual property IP. For example, the FRC merged codec 1150 may be implemented with one intellectual property IP, and may perform a frame rate converting operation or a video signal encoding/decoding operation depending on an operating mode.

The display controller 1160 displays image data decoded by the FRC merged codec 1150 or a frame rate converted image in the display 1400. The display controller 1160 may access a frame buffer allocated to the DRAM 1300 for the purpose of obtaining image data to be displayed. The display controller 1160 may read image data from a frame buffer area allocated to the DRAM 1300 and may display the image data in the display 1400.

The system interconnector 1170 is a system bus for providing an on-chip network within the system-on-chip 1100. The system interconnector 1170 may include, for example, a data bus, an address bus, and a control bus. The data bus is a path through which data move. The data bus may be mainly provided as a path for accessing the DRAM 1300 or the nonvolatile memory device 1200. The address bus provides an address exchange path between intellectual properties. The control bus provides a path through which control signals are transferred between the intellectual properties. However, a configuration of the system interconnector 1170 is not limited to the above description, and the system interconnector 1170 may further include arbitration devices for efficient management.

The nonvolatile memory device 1200 may be provided as a storage medium of the mobile device 1000. The nonvolatile memory device 1200 may store user data, application programs, an OS image, etc. The nonvolatile memory device 1200 may be implemented with a memory card (e.g., a multimedia card (MMC), an embedded MMC (eMMC), a secure digital (SD) card, or a microSD card). The nonvolatile memory device 1200 may include a high-capacity NAND-type flash memory. Alternatively, the nonvolatile memory device 1200 may include a next-generation nonvolatile memory, such as a phase change RAM (PRAM), a magnetic RAM (MRAM), a resistive RAM (ReRAM), or a ferroelectric RAM (FRAM), or a NOR flash memory. In another example embodiment of the inventive concept, it may be well understood that the nonvolatile memory device 1200 may be implemented with an embedded memory provided within the system-on-chip 1100.

In booting, application programs or an operating system (OS) may be loaded onto the DRAM 1300. For example, when the mobile device 1000 is booted up, an OS image stored in the nonvolatile memory device 1200 is loaded onto the DRAM 1300 depending on a booting sequence. Overall input/output operations of the mobile device 1000 may be supported by the operating system. Likewise, application programs which are selected by a user or are used to provide a basic service may be loaded onto the DRAM 1300. In addition, the DRAM 1300 may be used as a buffer memory which stores image data provided from an image sensor such as a camera. The DRAM 1300 may be implemented with a volatile memory such as an SRAM or a nonvolatile memory such as a PRAM, an MRAM, a ReRAM, a FRAM, or a NOR flash memory.

The display 1400 displays image data provided under control of the display controller 1160.

According to the above description, the mobile device 1000 may provide a frame rate converting function through the FRC merged codec 1150. That is, according to the FRC merged codec 1150, a function necessary to convert a frame rate may be performed through a component(s) provided in the video codec 1150b. Accordingly, costs necessary to implement a frame rate converter FRC may be reduced, and a decrease in a chip area is possible.

Figure 2:
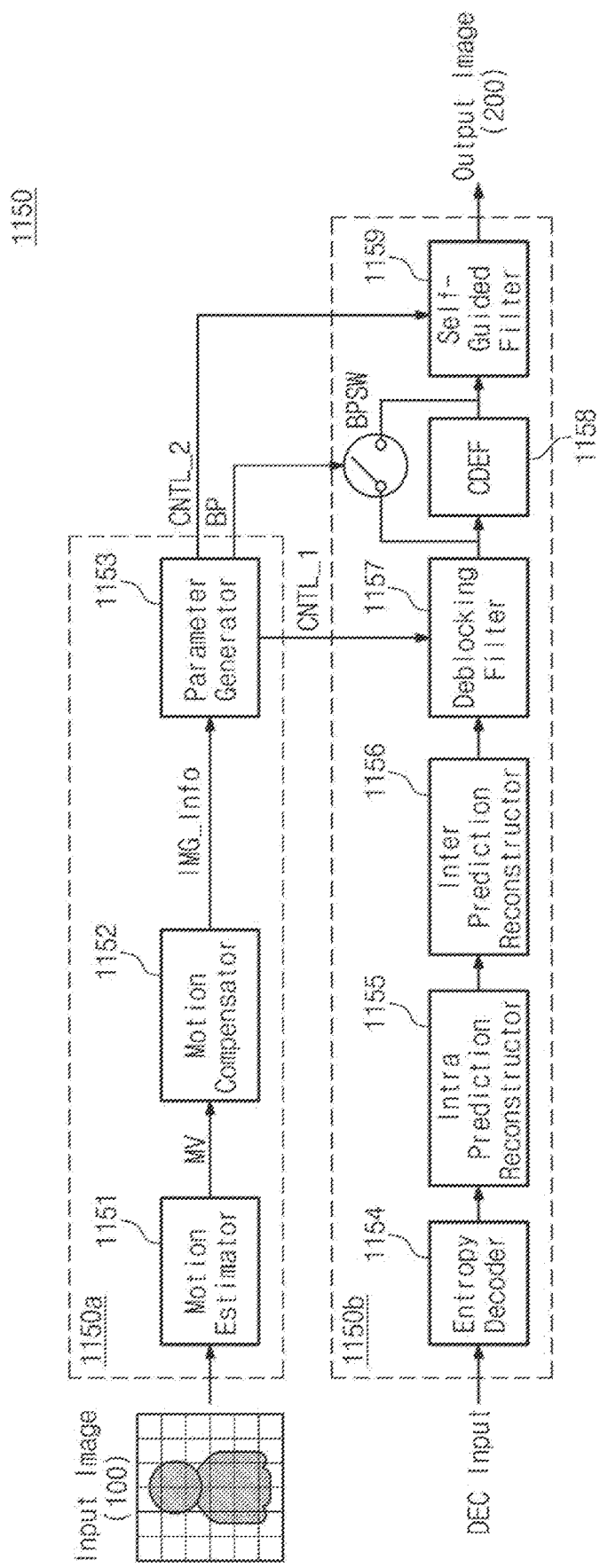
FIG. 2 is a block diagram illustrating an example embodiment of an FRC merged codec of FIG. 1.

FIG. 2 is a block diagram illustrating an example embodiment of an FRC merged codec of FIG. 1. Referring to FIG. 2, the FRC merged codec 1150 according to an example embodiment may be divided into the frame rate converter 1150a and the video codec 1150b. In an embodiment, the frame rate converter 1150a may perform post-processing of a frame rate converting operation by using a deblocking filter 1157 and a self-guided filter 1159 of the video codec 1150b.

The frame rate converter 1150a may include a motion estimator 1151, a motion compensator 1152, and a parameter generator 1153. The motion estimator 1151 calculates a motion vector MV by estimating a motion based on a current frame and a previous frame simultaneously provided from a frame buffer (not illustrated). In some embodiments, the previous frame may be the frame immediately preceding the current frame. The current and previous frames may correspond to an input image 100. The motion estimator 1151 calculates the motion vector MV of a specific area of the current and previous frames or the whole area of the current and previous frames, and transfers the motion vector MV to the motion compensator 1152.

The motion compensator 1152 generates an interpolation frame between the current frame and the previous frame by using the motion vector MV of the current frame. In some embodiments, the motion vector MV of the current frame may be the motion vector MV calculated by estimating the motion based on the current frame and the previous frame, as discussed above. The motion compensator 1152 inserts the interpolation frame between the current frame and the previous frame. In this case, a current frame and an interpolation frame may be output from the motion compensator 1152 at a 1:1 ratio. Through an output of a current frame and an interpolated frame, the frame rate converter 1150a may convert a frame rate of the input image 100.

The parameter generator 1153 may generate a parameter for using a component(s) of the video codec 1150b by using image information IMG_Info provided from the motion compensator 1152. For example, the parameter generator 1153 may generate a first control parameter CNTL_1 for setting the deblocking filter 1157 of the video codec 1150b, based on the image information IMG_Info. Alternatively, the parameter generator 1153 may generate a second control parameter CNTL_2 for setting the self-guided filter 1159 of the video codec 1150b, based on the image information IMG_Info received by the parameter generator 1153. In addition, the parameter generator 1153 may control a bypass switch BPSW of the video codec 1150b in a frame rate converting operation. To this end, the parameter generator 1153 may generate a control signal BP for bypassing a constrained directional enhancement filter (CDEF) 1158 of the video codec 1150b.

The video codec 1150b may encode or decode a video signal corresponding to a moving picture compression standard (e.g., an AV1 standard) applied to the system-on-chip 1100. Here, only a decoder circuit performing some functions of the frame rate converter 1150a of the inventive concept is illustrated. The video codec 1150b may include an entropy decoder 1154, an intra prediction reconstructor 1155, an inter prediction reconstructor 1156, the deblocking filter 1157, the constrained directional enhancement filter 1158, and the self-guided filter 1159. The video codec 1150b may further include the bypass switch BPSW for skipping a function of the constrained directional enhancement filter 1158.

In the case of a codec mode where the FRC merged codec 1150 operates as a video codec, the frame rate converter 1150a may be deactivated. In the codec mode, the entropy decoder 1154 may perform entropy decoding on a received decoder input DEC input. For example, the entropy decoder 1154 may perform decoding on an input bit stream in a codec mode under control of the processor. In an entropy code, a small number of bits are allocated to a symbol having the high probability of occurrence, and a large number of bits are allocated to a symbol having the low probability of occurrence. Accordingly, the size of a bit stream associated with symbols targeted for decoding may be reduced.

The intra prediction reconstructor 1155 and the inter prediction reconstructor 1156 generate a recovery frame from a prediction block provided from the entropy decoder 1154. The recovery frame is filtered by the deblocking filter 1157 again. Image data may be compressed in the unit of macroblock. In this case, a blocking effect occurs at a boundary point between blocks of a recovered image upon recovering the image data thus compressed. The blocking effect refers to a phenomenon in which a difference occurs in a screen including multiple block units due to a discontinuity of an image data value or a slope. Since the blocking effect appears along a boundary of a block in the form of a rectangular lattice, the blocking effect may be easily perceived, thereby causing a decrease in a subjective image quality. The deblocking filter 1157 performs a function of a low pass filter for reducing the blocking effect. In addition, the data processed by the deblocking filter 1157 may be processed in the constrained directional enhancement filter 1158 and the self-guided filter 1159 and may be output as a recovery output image 200.

The constrained directional enhancement filter 1158 removes ringing or noise along an edge of the image data processed by the deblocking filter 1157 in the codec mode. For example, the constrained directional enhancement filter 1158 is a directional filter which performs filtering along an edge. The self-guided filter 1159, which is an edge preserving filter, may provide a general image with an unsharp mask filter-like effect. Accordingly, a filter strength of the self-guided filter 1159 may be controlled by the parameter generator 1153 using the second control parameter CNTL_2.

The FRC merged codec 1150 according to example embodiments of the inventive concept includes the frame rate converter 1150a which uses the deblocking filter 1157 and the self-guided filter 1159 of the video codec 1150b. The frame rate converter 1150a may perform post-processing of the frame rate converting operation by using the deblocking filter 1157 and the self-guided filter 1159 of the video codec 1150b. To this end, the frame rate converter 1150a may include the parameter generator 1153. For example, the parameter generator 1153 may generate first and second control parameter CNTL_1 and CNTL_2, which are transmitted to the deblocking filter 1157 and the self-guided filter 1159, respectively, thereby allowing the frame rate converter 1150a to perform post-processing of the frame rate converting operation using the deblocking filter 1157 and the self-guided filter 1159 of the video codec 1150b.

Figure 3:
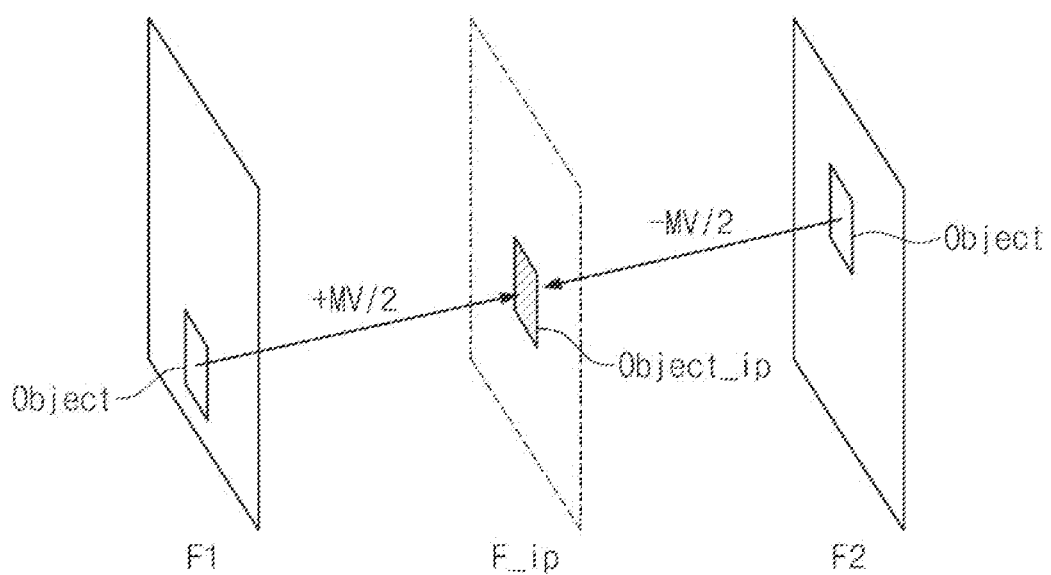
FIG. 3 is a diagram illustrating an example frame rate converting operation of an FRC merged codec of FIG. 2.

FIG. 3 is a diagram illustrating a frame rate converting operation of an FRC merged codec of FIG. 2. Referring to FIG. 3, the FRC merged codec 1150 may estimate a motion vector MV from a current frame F2 and a previous frame F1 and may generate an interpolation frame F_ip with reference to the estimated motion vector MV. A frame rate may be converted by inserting the interpolation frame F_ip.

In most cases, an image signal, such as frame data, generally has a redundancy since an autocorrelation of two frames is great. A data compression effect may be obtained by removing the redundancy. In this case, to efficiently compress a temporarily varying frame, it is necessary to remove a redundancy of a time axis direction as well as a redundancy on a two-dimensional space. According to the redundancy removal of the time axis direction, the amount of data to be transmitted may be considerably reduced by fetching a portion of a current frame, which does not change or is similar to just a previous frame even though moved, from the previous frame. To this end, a search may be performed to identify the most similar block between a previous frame and a current frame. This search may be referred to as "motion estimation". A motion vector MV may be used to describe how much a block moves, that is, a displacement.

Meanwhile, as a motion estimation method, a block matching algorithm may be generally used in consideration of accuracy and efficiency of the degree of motion, real-time processing possibility, hardware implementation, etc. In the block matching algorithm, a motion is estimated by comparing two sequential image frames (e.g., a preceding frame and a following frame) in the unit of block. In a block matching operation, prediction and compensation may be performed in the unit of macroblock. In the case of converting a frame rate by using motion information of an image, according to the block matching algorithm, a motion vector MV may be estimated with reference to a preceding frame and a following frame, and frame interpolation may be performed by using the estimated motion vector MV.

For example, the frame rate converter 1150a compares the current frame F2 and the previous frame F1, and calculates a motion vector MV. The current frame F2 has a state in which a specific portion of the previous frame F1 is changed. For example, it is assumed that an object is included in a first block in the previous frame F1 and is included in a second block in the current frame F2. In this example, the interpolation frame F_ip has an intermediate state in a state change from the current frame F2 to the previous frame F1. Accordingly, in the interpolation frame F_ip, the object may be estimated as being placed on the center between a position on the previous frame F1 and a position on the current frame F2.

As a result, the frame rate converter 1150a generates the interpolation frame F_ip corresponding to an intermediate state between a state of the previous frame F1 and a state of the current frame F2. The frame rate converter 1150a may convert a frame rate by inserting the interpolation frame F_ip between the previous frame F1 and the current frame F2. For example, in the case where "n" interpolation frames are inserted between the previous frame F1 and the current frame F2, a frame rate increases as much as "n" times.

Meanwhile, upon generating the interpolation frame F_ip, a motion estimation/motion compensation technology may be applied. Here, motion estimation means predicting a motion or displacement vector for placing a matched block of a reference frame (or a previous frame) at a current frame. Also, motion compensation refers to the process of actually aligning a block in a reference frame with a matched block in a current frame.

As described above, an image input through a frame rate converting operation using the motion estimation and compensation technology may be expressed as a smoother image. The motion estimation and compensation described above is called "pre-processing" of the frame rate converting operation. Deblocking processing or edge enhancement processing associated with image data output through pre-processing is called "post-processing" of the frame rate converting operation. The FRC merged codec 1150 according to example embodiments of the inventive concept may perform the pre-processing of the frame rate converting operation by using the frame rate converter 1150a and may perform the post-processing of the frame rate converting operation by using the video codec 1150b.

Figure 4:
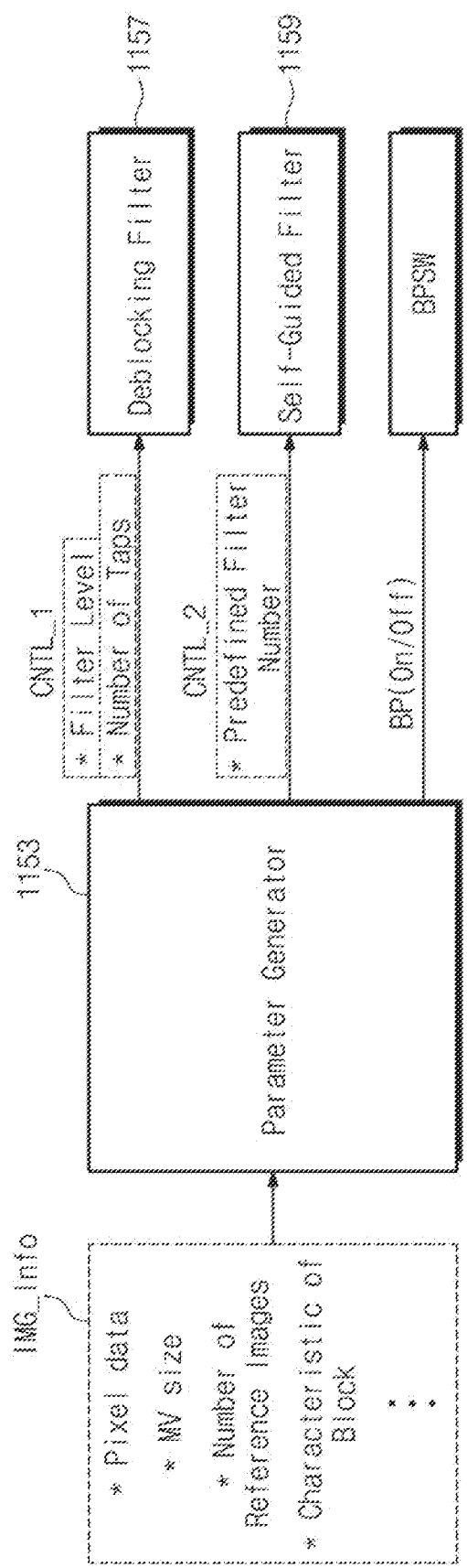
FIG. 4 is a block diagram describing an operation of a parameter generator of a frame rate converter, according to an example embodiment of the inventive concept.

FIG. 4 is a block diagram describing an operation of a parameter generator of a frame rate converter according to example embodiments of the inventive concept. Referring to FIG. 4, the parameter generator 1153 may generate parameters and control signals for post-processing following the motion estimation and the motion compensation of the frame rate converter 1150a.

The parameter generator 1153 receives the image information IMG_Info from the motion compensator 1152. The image information IMG_Info includes information generated by the motion estimator 1151 and the motion compensator 1152. For example, the image information IMG_Info may include information about pixel data of an image to be processed, a size of a motion vector MV, the number of reference images used for the motion estimation and compensation, and a characteristic of a block. Here, the characteristic of block is associated with, for example, information indicating whether a relevant image block corresponds to a text area or a small object area.

The parameter generator 1153 generates a parameter for controlling at least one of the deblocking filter 1157, the self-guided filter 1159, and the bypass switch BPSW using the image information IMG_Info.

The parameter generator 1153 may generate the first control parameter CNTL_1 for controlling the deblocking filter 1157. In the case where the video codec 1150b corresponds to the AV1 standard, the deblocking filter 1157 may perform filtering in the unit of 4×4 pixels. Accordingly, the parameter generator 1153 may calculate a noise strength (or level) numerically, may decide a filter level (or strength) or the number of filter taps depending on the calculated noise level, and may generate the first control parameter CNTL_1 based on the decided result. The first control parameter CNTL_1 may include information about the filter level or the number of filter taps for setting the deblocking filter 1157.

The parameter generator 1153 may selectively generate the second control parameter CNTL_2 for controlling the self-guided filter 1159. In the case where the video codec 1150b corresponds to the AV1 standard, the self-guided filter 1159 may change a filter parameter in the unit of 64×64 pixels. However, in the case of a frame rate conversion (FRC) mode, it may be necessary to change a filter parameter, for example, in the unit of 8×8 pixels. Accordingly, in the FRC mode, the parameter generator 1153 may calculate a block size and a filter strength suitable for the frame rate converting operation. The parameter generator 1153 may output the calculated information as a value (e.g., the number of filters) for adjusting an on/off and a strength of the self-guided filter 1159.

The parameter generator 1153 may output the switch control signal BP for bypassing an operation of the constrained directional enhancement filter 1158 in the FRC mode. In the case where the FRC merged codec 1150 operates in a general codec mode, the parameter generator 1153 turns off the bypass switch BPSW. Accordingly, in the codec mode, an output of the deblocking filter 1157 may be transferred to the self-guided filter 1159 after being processed by the constrained directional enhancement filter 1158. In contrast, in the case where the FRC merged codec 1150 operates in the FRC mode, the parameter generator 1153 turns on the bypass switch BPSW. In this case, an output of the deblocking filter 1157 may bypass the constrained directional enhancement filter 1158 so as to be transferred to the self-guided filter 1159.

Figure 5:
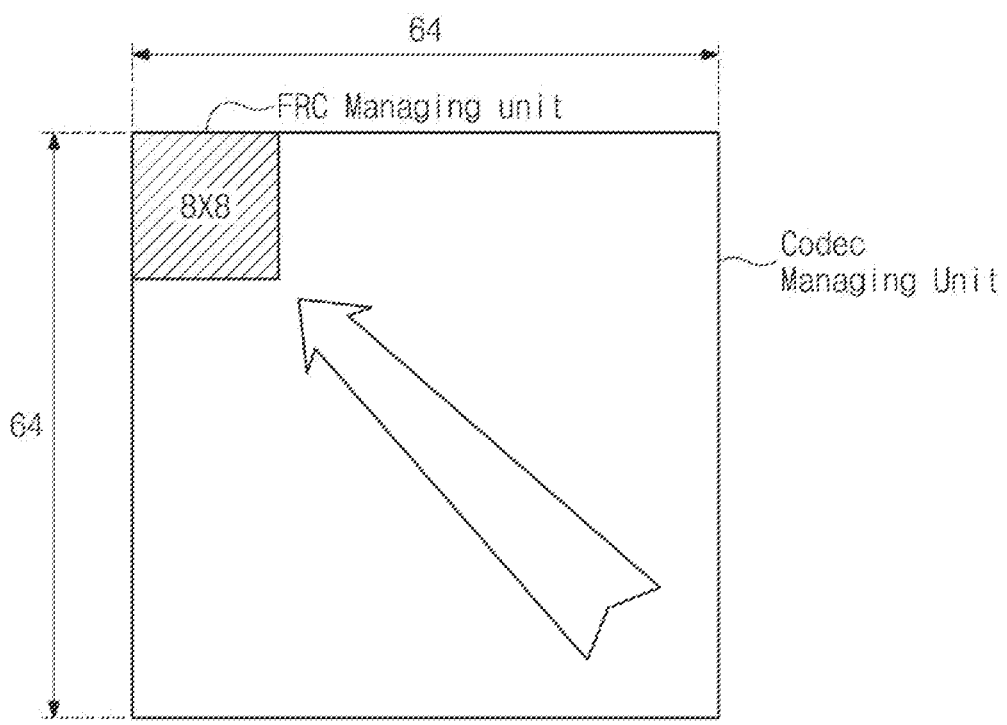
FIG. 5 is a diagram illustrating a change of a filtering unit according to an operating mode of an FRC merged codec, according to an example embodiment of the inventive concept.

FIG. 5 is a diagram illustrating a change of a filtering unit according to an operating mode of an FRC merged codec according to an example embodiment of the inventive concept. Referring to FIG. 5, the FRC merged codec 1150 may adjust a size of a block to be filtered in the case where the FRC merged codec 1150 operates in the codec mode and in the case where the FRC merged codec 1150 operates in the FRC mode.

For example, in the codec mode, the self-guided filter 1159 may change a filter parameter in the unit of 64×64 pixels. For example, in the case where the FRC merged codec 1150 operates in the codec mode (e.g., AV1 standard), the self-guided filter 1159 may perform filtering in the unit of 64×64 pixels. However, in the case of the FRC mode, a filter parameter may be changed in the unit of 8×8 pixels. For example, in the case where the FRC merged codec 1150 operates in the FRC mode, the self-guided filter 1159 may perform filtering in the unit of 8×8 pixels.

As such, the parameter generator 1153 may generate a parameter value indicating a number of taps (or filter length) and a filter processing-targeted pixel range set according to a block size in the FRC mode to provide the generated parameter value to the deblocking filter 1157 or the self-guided filter 1159.

Figure 6:
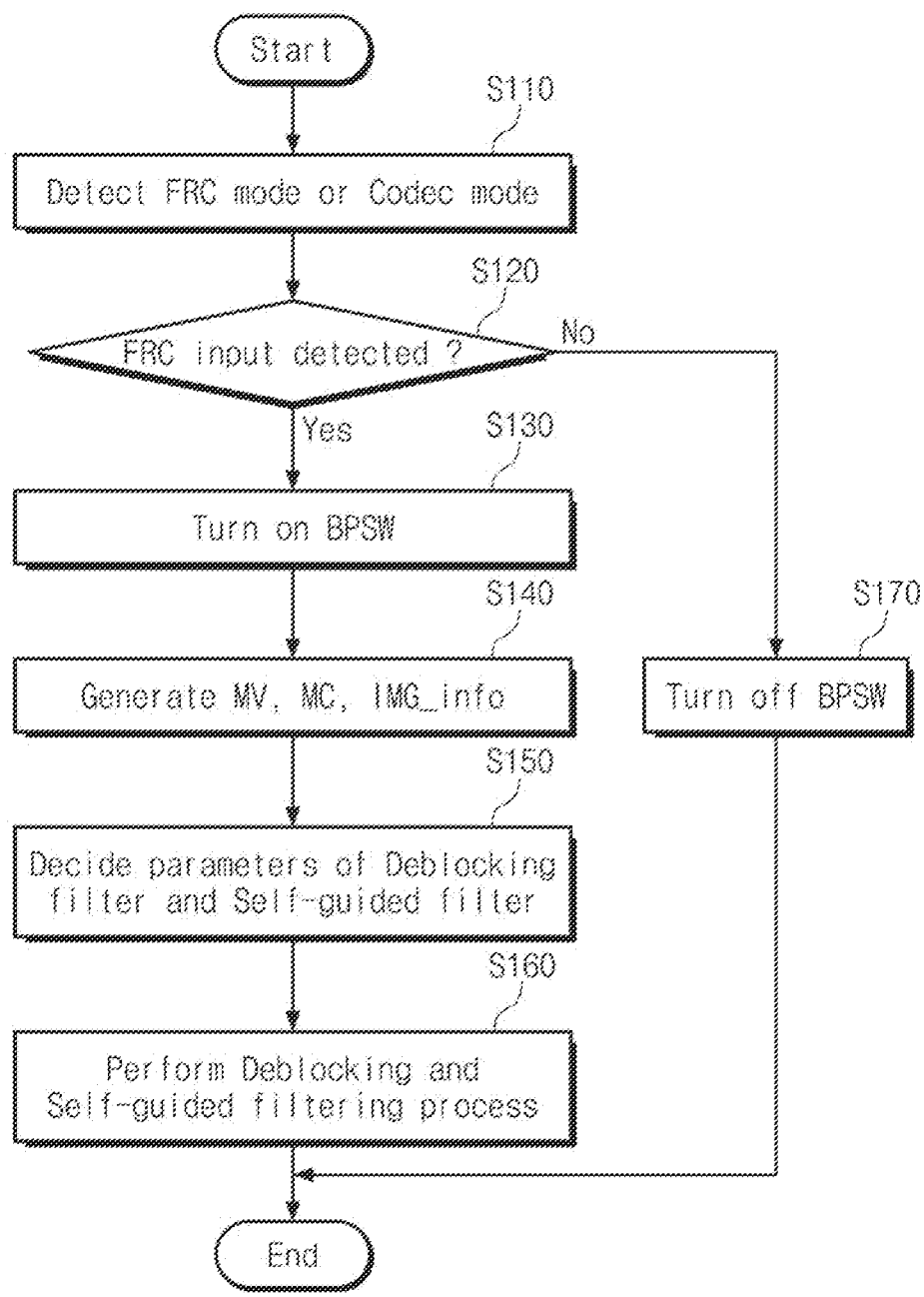
FIG. 6 is a flowchart illustrating how an FRC merged codec operates depending on an operating mode, according to an example embodiment of the inventive concept.

FIG. 6 is a flowchart illustrating how an FRC merged codec operates depending on an operating mode, according to an example embodiment of the inventive concept. Referring to FIG. 6, the FRC merged codec 1150 may variably control a strength of filters and the number of taps depending on a mode.

In operation S110, the FRC merged codec 1150 detects an operating mode to be performed. For example, in the case where the FRC merged codec 1150 currently operates in the codec mode, the FRC merged codec 1150 may determine whether to change a mode to the FRC mode or whether to maintain the codec mode under control of the processor 1110 or depending on a request of the processor 1110. Alternatively, in the case where the FRC merged codec 1150 currently operates in the FRC mode, the FRC merged codec 1150 may determine whether to maintain the FRC mode or whether to switch to the codec mode.

In operation S120, the FRC merged codec 1150 determines an operating mode to be performed in response to an input signal, under control of the processor 1110, or depending on a request of the processor 1110. For example, when the detected input signal is determined to be an FRC input (S120, Yes) the input signal is to be processed in the FRC mode, the procedure proceeds to operation S130. When the detected input signal is determined not to be an FRC input (S120, No) the input signal is to be processed by using a video codec, the procedure proceeds to operation S170.

In operation S130, the parameter generator 1153 turns on the bypass switch BPSW for the purpose of bypassing the constrained directional enhancement filter 1158. For example, the parameter generator 1153 turns on the bypass switch BPSW by using the switch control signal BP.

In operation S140, a pre-processing operation for frame rate conversion is performed. For example, a motion vector MV may be generated by the motion estimator 1151, and the motion vector MV may be processed by the motion compensator 1152. Image information, such as a size of the motion vector MV, pixel image data, the number of reference images to be used for motion compensation, and a characteristic of a block, may be transferred to the parameter generator 1153.

In operation S150, the parameter generator 1153 may output the first control parameter CNTL_1 for controlling the deblocking filter 1157 and the second control parameter CNTL_2 for controlling the self-guided filter 1159. The first control parameter CNTL_1 may include information about a filter level and the number of filter taps for setting the deblocking filter 1157.

In operation S160, depending on the first and second control parameters CNTL_1 and CNTL_2 provided from the parameter generator 1153, filtering is performed by the deblocking filter 1157 and the self-guided filter 1159. In this case, a recovery image may be output by the deblocking filter 1157 and the self-guided filter 1159 as an execution result of the FRC mode.

In operation S170, the FRC merged codec 1150 continues to operate in the codec mode. For example, all components of the video codec 1150b are activated such that decoding is performed on a video signal. To this end, the bypass switch BPSW may be turned off.

An operation mode setting method in the FRC merged codec 1150 is described above. In the case where the FRC merged codec 1150 of the example embodiments of the inventive concept operates in the FRC mode, the deblocking filter 1157 and the self-guided filter 1159 included in the video codec 1150b are used. In this case, a filter characteristic of the deblocking filter 1157 and the self-guided filter 1159 may be adjusted by the parameter generator 1153 for an operation in the FRC mode. Accordingly, the number of components or circuits corresponding to the deblocking filter 1157 and the self-guided filter 1159 may decrease.

Figure 7:
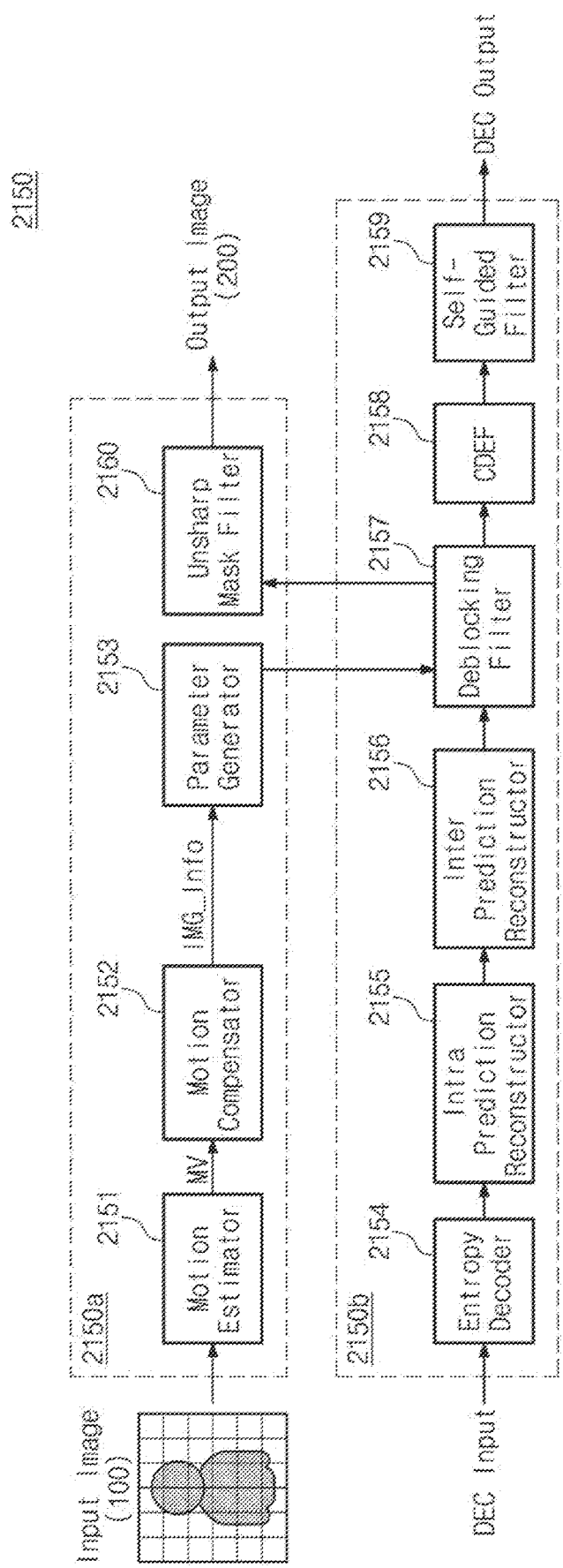
FIG. 7 is a block diagram illustrating an FRC merged codec, according to another example embodiment of the inventive concept.

FIG. 7 is a block diagram illustrating an FRC merged codec according to another example embodiment of the inventive concept. Referring to FIG. 7, an FRC merged codec 2150 according to another embodiment may include a frame rate converter 2150a and a video codec 2150b. In an example embodiment, the frame rate converter 2150a may perform post-processing of a frame rate converting operation only by using a deblocking filter 2157 of the video codec 2150b.

The frame rate converter 2150a may include a motion estimator 2151, a motion compensator 2152, a parameter generator 2153, and an unsharp mask filter 2160. The motion estimator 2151 calculates a motion vector MV by estimating a motion based on a current frame and a previous frame simultaneously provided from a frame buffer (not illustrated). In some embodiments, the previous frame may be the frame immediately preceding the current frame. The current and previous frames may correspond to an input image 100. The motion compensator 2152 generates an interpolation frame between a current frame and a previous frame by using the motion vector MV. The motion compensator 2152 inserts and outputs the interpolation frame between the current frame and the previous frame. Functions of the motion estimator 2151 and the motion compensator 2152 may be identical to those of the motion estimator 1151 and the motion compensator 1152, respectively, as discussed above. Thus, additional description will be omitted to avoid redundancy. The motion vector MV, motion-compensated image data, the number of reference images, or a characteristic of a block is provided to the parameter generator 2153 as the image information IMG_Info.

The parameter generator 2153 may provide the deblocking filter 2157 with control information such as a filter level or the number of filter taps, based on the image information IMG_Info received from motion compensator 2152. The deblocking filter 2157 performs deblocking filter processing on pixel data of the image and transfers a result of the deblocking filter processing to the unsharp mask filter 2160. The unsharp mask filter 2160 may perform a filtering operation enhancing a detailed edge of an image again.

The video codec 2150b may include an entropy decoder 2154, an intra prediction reconstructor 2155, an inter prediction reconstructor 2156, the deblocking filter 2157, a constrained directional enhancement filter (CDEF) 2158, and a self-guided filter 2159. Functions of the entropy decoder 2154, the intra prediction reconstructor 2155, the inter prediction reconstructor 2156, the constrained directional enhancement filter (CDEF) 2158, and the self-guided filter 2159 may be identical to those of the entropy decoder 1154, the intra prediction reconstructor 1155, the inter prediction reconstructor 1156, the constrained directional enhancement filter (CDEF) 1158, and the self-guided filter 1159, respectively, which have been discussed above. Thus, additional description will be omitted to avoid redundancy. In an example embodiment, the self-guided filter 2159 of the video codec 2150b and the unsharp mask filter 2160 of the frame rate converter 2150a are implemented independently and operate independently. For example, the unsharp mask filter 2160 may be activated only in the FRC mode, and the self-guided filter 2159 may be activated only in the codec mode.

Figure 8:
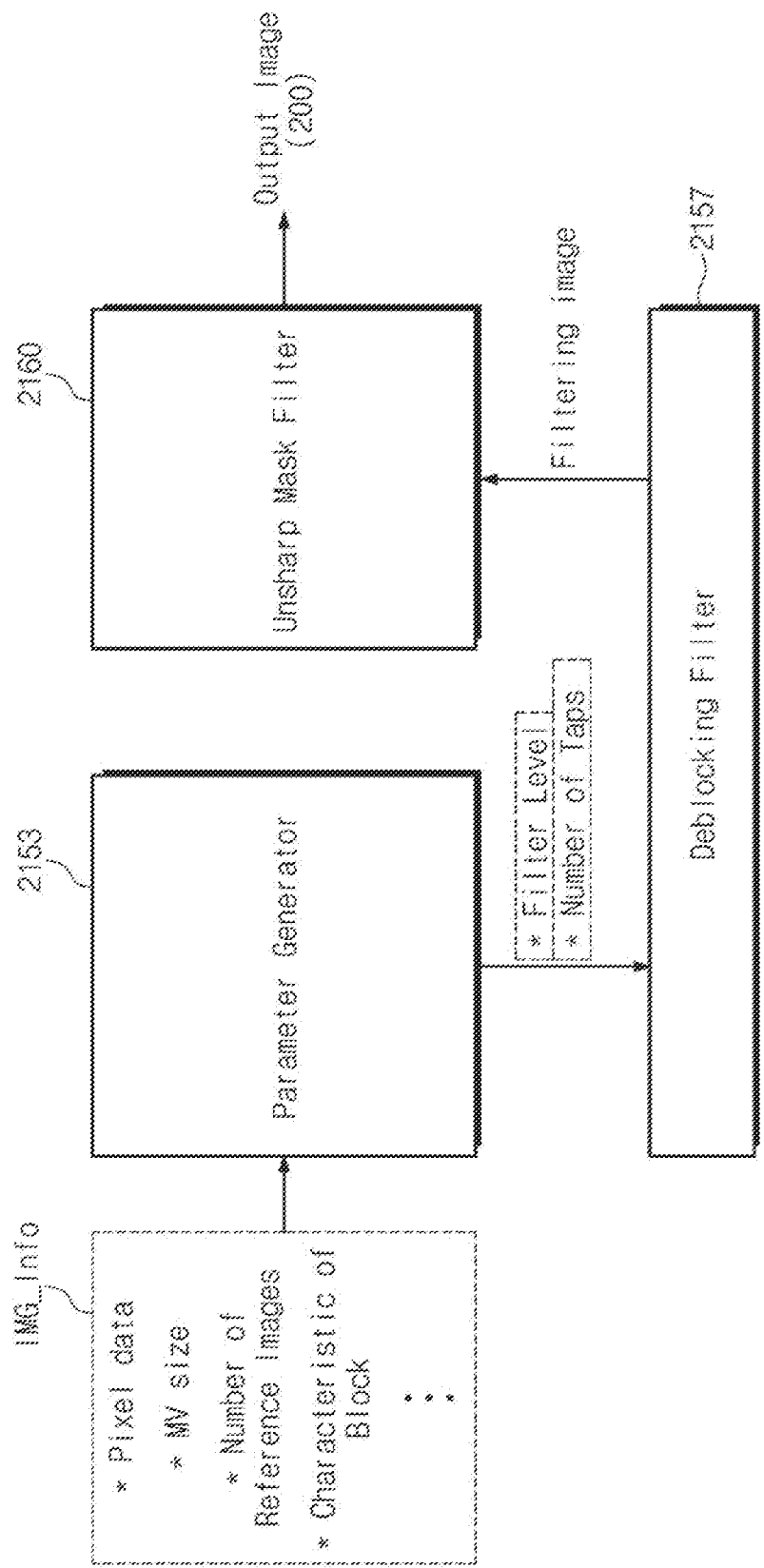
FIG. 8 is a block diagram describing an operation a parameter generator, a deblocking filter, and an unsharp mask filter of FIG. 7.

FIG. 8 is a block diagram describing an operation of the parameter generator 2153, the deblocking filter 2157, and the unsharp mask filter 2160 of FIG. 7. Referring to FIG. 8, post-processing of a frame rate converting operation may be performed by the parameter generator 2153, the deblocking filter 2157, and the unsharp mask filter 2160.

The parameter generator 2153 receives the image information IMG_Info from the motion compensator 2152. The image information IMG_Info may include information about pixel data of an image to be processed, a size of a motion vector MV, the number of reference images used for the motion estimation and compensation, and a characteristic of a block. Here, the characteristic of the block is associated with, for example, information indicating whether a relevant image block corresponds to a text area or a small object area.

The parameter generator 2153 generates a parameter for controlling the deblocking filter 2157 by using the image information IMG_Info. The parameter generator 2153 calculates a noise strength (or level) of pixel data numerically for the purpose of controlling the deblocking filter 2157, may decide a filter level or the number of filter taps depending on the calculated noise strength, and may transfer the decided result to the deblocking filter 2157.

The deblocking filter 2157 performs deblocking filtering by using the information provided from the parameter generator 2153 and transfers a result of the deblocking filtering to the unsharp mask filter 2160. The unsharp mask filter 2160 performs a filtering operation enhancing a detailed edge of the image processed by the deblocking filter 2157. The unsharp mask filter 2160 outputs an output image 200 as a result of the filtering operation.

How the parameter generator 2153 and the unsharp mask filter 2160 of the frame rate converter 2150a and the deblocking filter 2157 of the video codec 2150b operate in the FRC mode is briefly described above. However, in the codec mode, the frame rate converter 2150a may be deactivated, and overall operations of the video codec 2150b may be activated.

Figure 9:
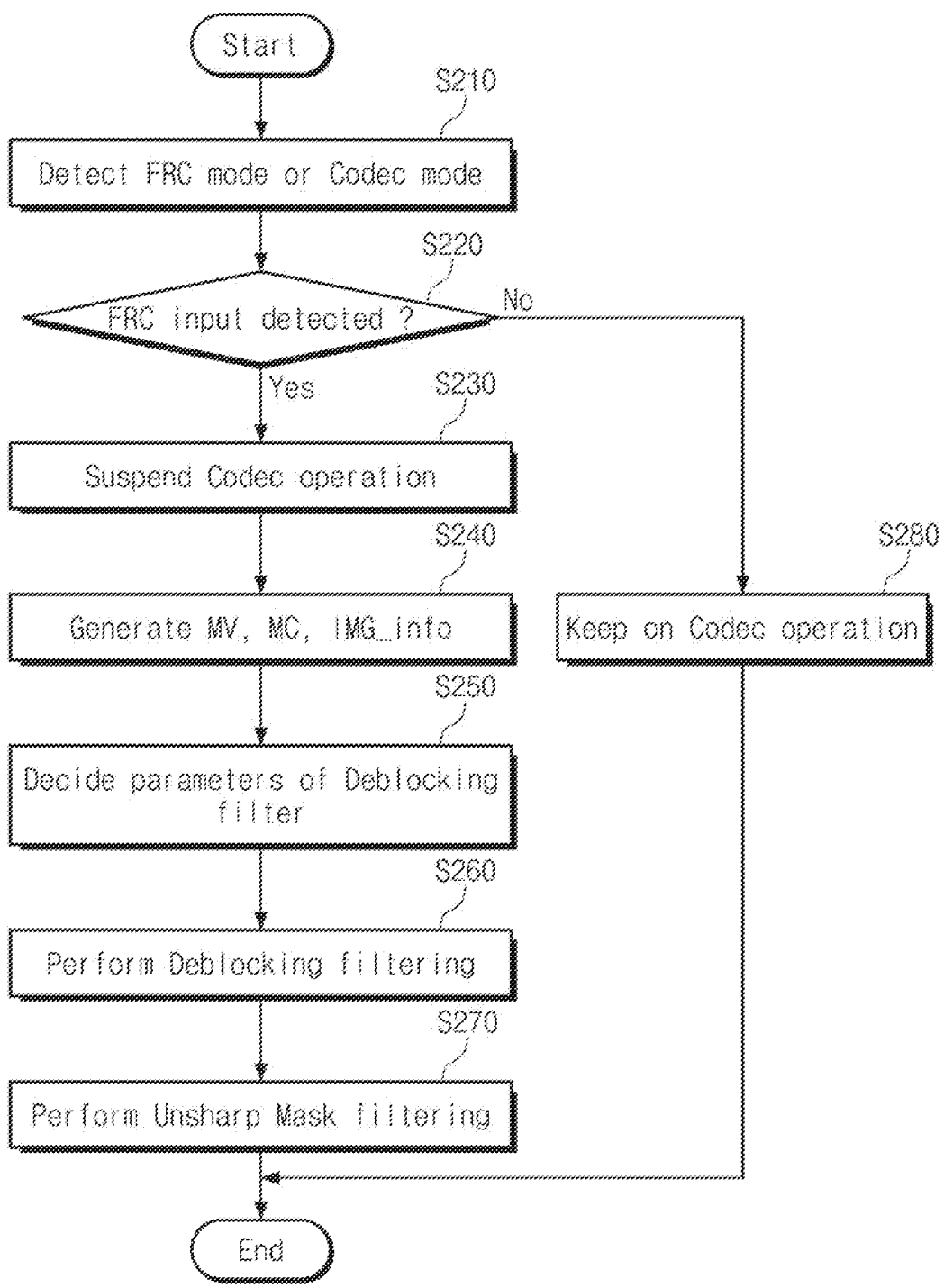
FIG. 9 is a flowchart illustrating how an FRC merged codec operates depending on an operating mode of an FRC merged codec, according to another example embodiment of the inventive concept.

FIG. 9 is a flowchart illustrating how an FRC merged codec operates depending on an operating mode of an FRC merged codec, according to another example embodiment of the inventive concept. Referring to FIG. 9, the FRC merged codec 2150 may execute the FRC mode and the codec mode by using one deblocking filter 2157. In this example, it is assumed that the FRC merged codec 2150 currently operates in the codec mode.

In operation S210, the FRC merged codec 2150 detects an operating mode to be performed. The FRC merged codec 2150 may determine whether to change a mode to the FRC mode or whether to maintain the codec mode in response to an input signal, under control of the processor 1110 (refer to FIG. 1), or depending on a request of the processor 1110.

In operation S220, the FRC merged codec 2150 decides the operating mode to be performed in response to an input signal, under control of the processor 1110, or depending on a request of the processor 1110. For example, the detected input signal is determined to be an FRC input (S220, Yes) and the input signal is to be processed in the FRC mode, the procedure proceeds to operation S230. In contrast, when the detected input signal is determined not to be an FRC input (S220, No) and the input signal is to be processed in the codec mode, the procedure proceeds to operation S280.

In operation S230, the FRC merged codec 2150 suspends overall settings or an operation of the codec mode in which an operation is currently performed.

In operation S240, pre-processing for frame rate conversion is performed. For example, a motion vector MV may be generated by the motion estimator 2151, and the motion vector MV may be processed by the motion compensator 2152. Image information such as a size of the motion vector MV, pixel data, the number of reference images to be used for motion compensation, and a characteristic of a block may be transferred to the parameter generator 2153.

In operation S250, the parameter generator 2153 generates a control parameter for controlling the deblocking filter 2157 and transfers the control parameter to the deblocking filter 2157. However, in the embodiment of FIG. 9, the parameter generator 2153 may not provide a control signal for bypassing the constrained directional enhancement filter 2158 or information for controlling the self-guided filter 2159.

In operation S260, the deblocking filter 2157 performs deblocking processing on pixel data, based on the control parameter provided from the parameter generator 2153. An image filtered by the deblocking filter 2157 may be output to the unsharp mask filter 2160.

In operation S270, the unsharp mask filter 2160 performs additional processing on the filtered image provided from the deblocking filter 2157. The unsharp mask filter 2160 performs a filtering operation enhancing a detailed edge of the image processed by the deblocking filter 2157. A recovery image may be output from the unsharp mask filter 2160 as an execution result of the FRC mode.

In operation S280, the FRC merged codec 2150 continues to operate in the codec mode. That is, all components of the video codec 2150b are activated such that decoding is performed on a video signal.

An operating method of the FRC merged codec 2150 is briefly described above. In the case where the FRC merged codec 2150 of an example embodiment of the inventive concept operates in the FRC mode, only the deblocking filter 2157 included in the video codec 2150b may be used to process an input pixel image. However, in the embodiment of FIG. 9, the unsharp mask filter 2160 of the frame rate converter 2150a and the self-guided filter 2159 of the video codec 2150b are separate components which operate independently of each other. In some cases, it may be more efficient to implement the unsharp mask filter 2160 and the self-guided filter 2159 independently even though the unsharp mask filter 2160 and the self-guided filter 2159 perform similar operations.

Figure 10:
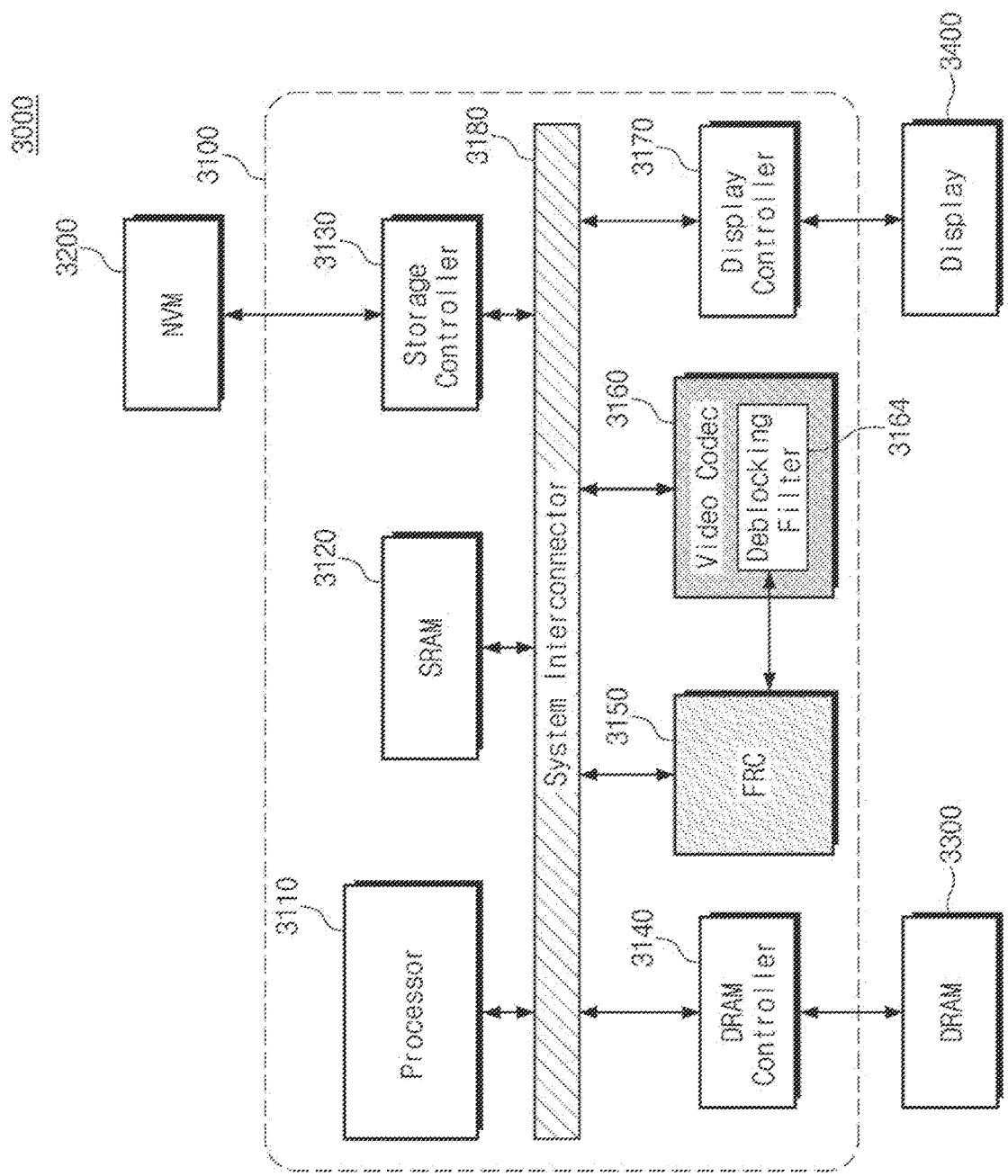
FIG. 10 is a block diagram illustrating a mobile device, according to another example embodiment of the inventive concept.

FIG. 10 is a block diagram illustrating a mobile device according to another example embodiment of the inventive concept. Referring to FIG. 10, a mobile device 3000 may include a system on chip (SoC) 3100, a nonvolatile memory (NVM) device 3200, a DRAM 3300, a display 3400, etc. The system-on-chip 3100 may include a processor 3110, an SRAM 3120, a storage controller 3130, a DRAM controller 3140, a frame rate converter 3150, a video codec 3160, a display controller 3170, and a system interconnector 3180. Here, the nonvolatile memory device 3200, the DRAM 3300, and the display 3400 are identical to the nonvolatile memory device 1200, the DRAM 1300, and the display 1400, respectively, of FIG. 1. Also, functions of the processor 3110, the SRAM 3120, the storage controller 3130, the DRAM controller 3140, the display controller 3170, and the system interconnector 3180 are identical to those of the processor 1110, the SRAM 1120, the storage controller 1130, the DRAM controller 1140, the display controller 1160, and the system interconnector 1170, respectively, of FIG. 1. Thus, additional description will be omitted to avoid redundancy.

The frame rate converter 3150 performs deblocking processing for performing a frame rate converting operation, by using a deblocking filter 3164 of the video codec 3160. However, the frame rate converter 3150 and the video codec 3160 are implemented with separated intellectual properties. The frame rate converter 3150 may process frame data by using the deblocking filter 3164 included in the video codec 3160.

The video codec 3160 may encode or decode a video signal corresponding to a moving picture compression standard applied to the system-on-chip 3100. The video codec 3160 includes the deblocking filter 3164. The deblocking filter 3164 may be shared with the frame rate converter 3150. Of course, the video codec 3160 may include components for a decoding function such as an entropy decoder, an intra prediction reconstructor, an inter prediction reconstructor, a constrained directional enhancement filter, and a self-guided filter. The video codec 3160 may perform decoding processing on a video signal through the above-described configuration in the codec mode. However, the remaining components of the video codec 3160 other than the deblocking filter 3164 are deactivated in the FRC mode.

The mobile device 3000 of example embodiments of the inventive concept includes the frame rate converter 3150 and the video codec 3160 implemented with separated intellectual properties. However, the frame rate converter 3150 does not include a deblocking filter, and deblocking filtering is performed only by using the deblocking filter 3164 included in the video codec 3160. This configuration may make it possible to reduce a circuit size of the frame rate converter 3150.

Figure 11:
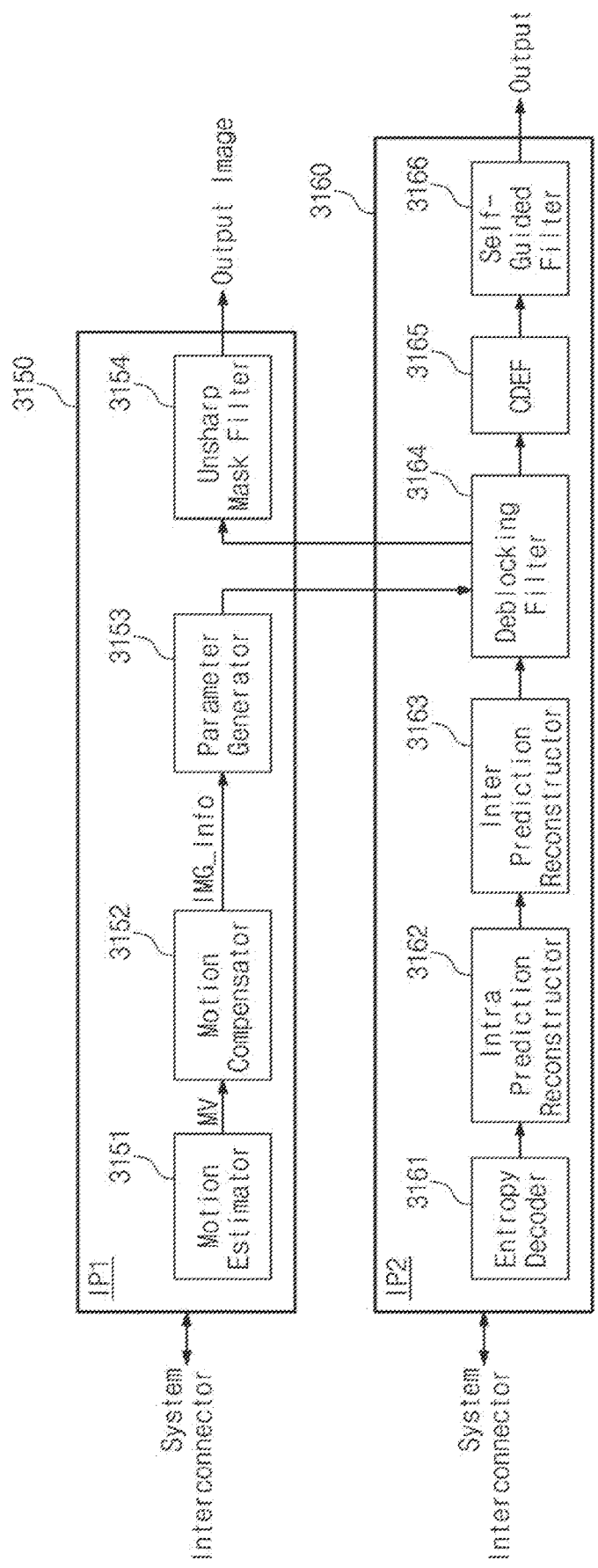
FIG. 11 is a diagram illustrating a frame rate converter and a video codec of FIG. 10.

FIG. 11 is a diagram illustrating a frame rate converter and a video codec of FIG. 10. Referring to FIG. 11, the frame rate converter 3150 and the video codec 3160 may be implemented with separated intellectual properties. The frame rate converter 3150 does not include a separate deblocking filter, but performs post-processing of a frame rate converting operation by using the deblocking filter 3164 of the video codec 3160.

The frame rate converter 3150 may include a motion estimator 3151, a motion compensator 3152, a parameter generator 3153, and an unsharp mask filter 3154. The video codec 3160 may include an entropy decoder 3161, an intra prediction reconstructor 3162, an inter prediction reconstructor 3163, the deblocking filter 3164, a constrained directional enhancement filter (CDEF) 3165, and a self-guided filter 3166.

Configurations and functions of the frame rate converter 3150 and the video codec 3160 are similar to the frame rate converter 2150a and the video codec 2150b described with reference to FIG. 7. However, the embodiment of FIG. 11 is different from the embodiment of FIG. 7 in that the frame rate converter 3150 and the video codec 3160 are implemented on separated intellectual properties IP1 and IP2, respectively. Accordingly, a description associated with detailed functions or configurations of the frame rate converter 3150 and the video codec 3160 illustrated in FIG. 11 is omitted.

Figure 12:
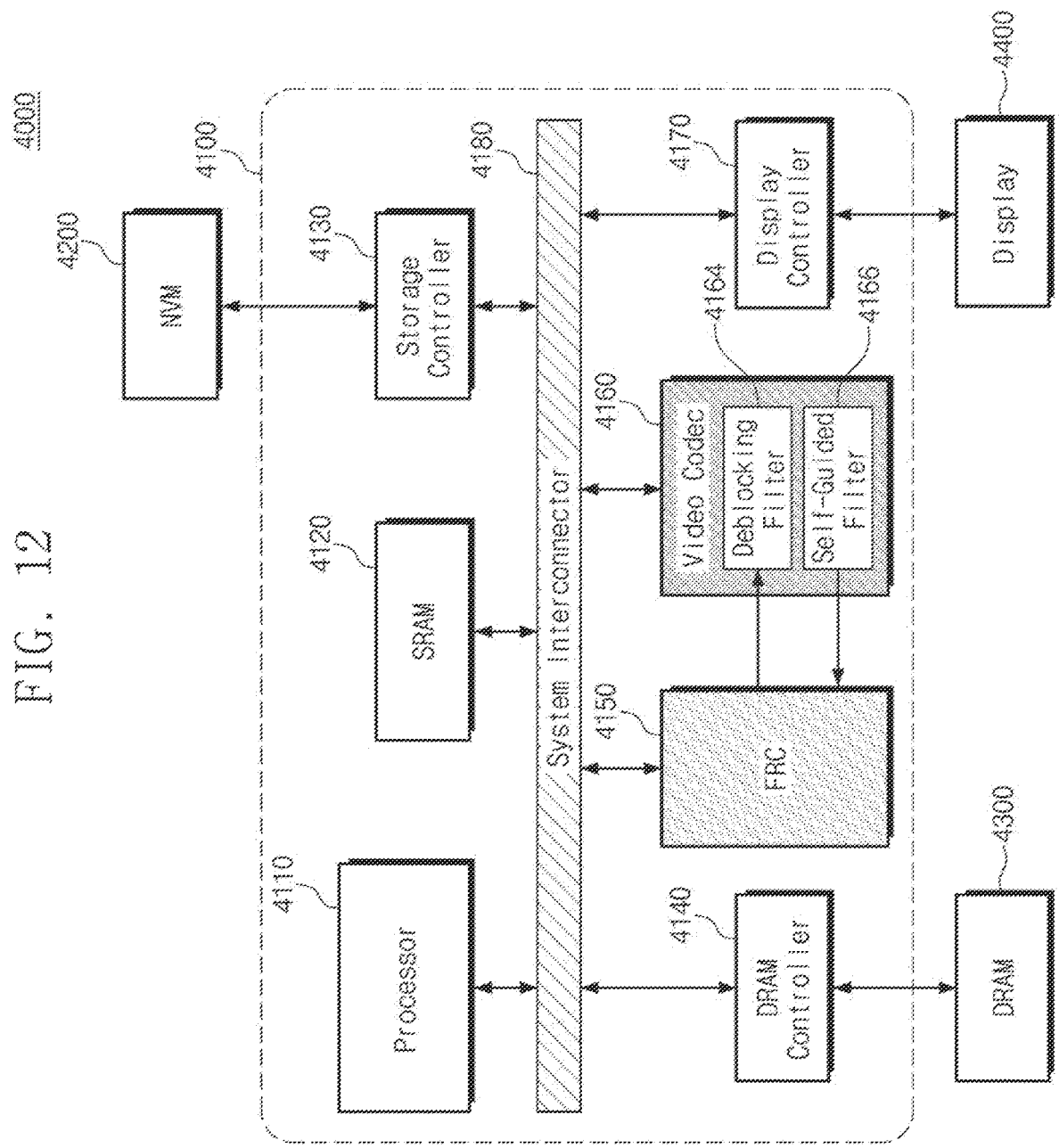
FIG. 12 is a block diagram illustrating a mobile device, according to another example embodiment of the inventive concept.

FIG. 12 is a block diagram illustrating a mobile device according to another example embodiment of the inventive concept. Referring to FIG. 12, a mobile device 4000 may include a system on chip (SoC) 4100, a nonvolatile memory (NVM) device 4200, a DRAM 4300, a display 4400, etc. The system-on-chip 4100 may include a processor 4110, an SRAM 4120, a storage controller 4130, a DRAM controller 4140, a frame rate converter 4150, a video codec 4160, a display controller 4170, and a system interconnector 4180. Functions of the nonvolatile memory device 4200, the DRAM 4300, the display 4400, the processor 4110, the SRAM 4120, the storage controller 4130, the DRAM controller 4140, the display controller 4170, and the system interconnector 4180 are identical to those of the nonvolatile memory device 1200, the DRAM 1300, the display 1400, the processor 1110, the SRAM 1120, the storage controller 1130, the DRAM controller 1140, the display controller 1160, and the system interconnector 1170, respectively, of FIG. 1. Thus, additional description will be omitted to avoid redundancy.

In a frame rate converting operation, the frame rate converter 4150 performs deblocking and unsharp mask filtering by using a deblocking filter 4164 and a self-guided filter 4166 of the video codec 4160, respectively. The frame rate converter 4150 and the video codec 4160 are implemented with separate intellectual properties.

The video codec 4160 may encode or decode a video signal corresponding to a moving picture compression standard applied to the system-on-chip 4100. The video codec 4160 includes the deblocking filter 4164 and the self-guided filter 4166. The deblocking filter 4164 and the self-guided filter 4166 may be shared with the frame rate converter 4150. Of course, the video codec 4160 may include components for a decoding function such as an entropy decoder, an intra prediction reconstructor, an inter prediction reconstructor, and a constrained directional enhancement filter. The video codec 4160 may perform decoding processing on a video signal through the above-described configuration in the codec mode. However, the remaining components of the video codec 4160 other than the deblocking filter 4164 and the self-guided filter 4166 are deactivated in the FRC mode.

The mobile device 4000 of example embodiments of the inventive concept includes the frame rate converter 4150 and the video codec 4160 implemented with separated intellectual properties. However, the frame rate converter 4150 does not include a deblocking filter and an unsharp mask filter. The frame rate converter 4150 performs deblocking filtering and unsharp mask filtering by using the deblocking filter 4165 and the self-guided filter 4166 included in the video codec 4160.

A description is given as the frame rate converter 4150 uses components of the video codec 4160 for the purpose of processing deblocking and unsharp mask filtering for constructing a recovery image, but the inventive concept is not limited thereto.

Figure 13:
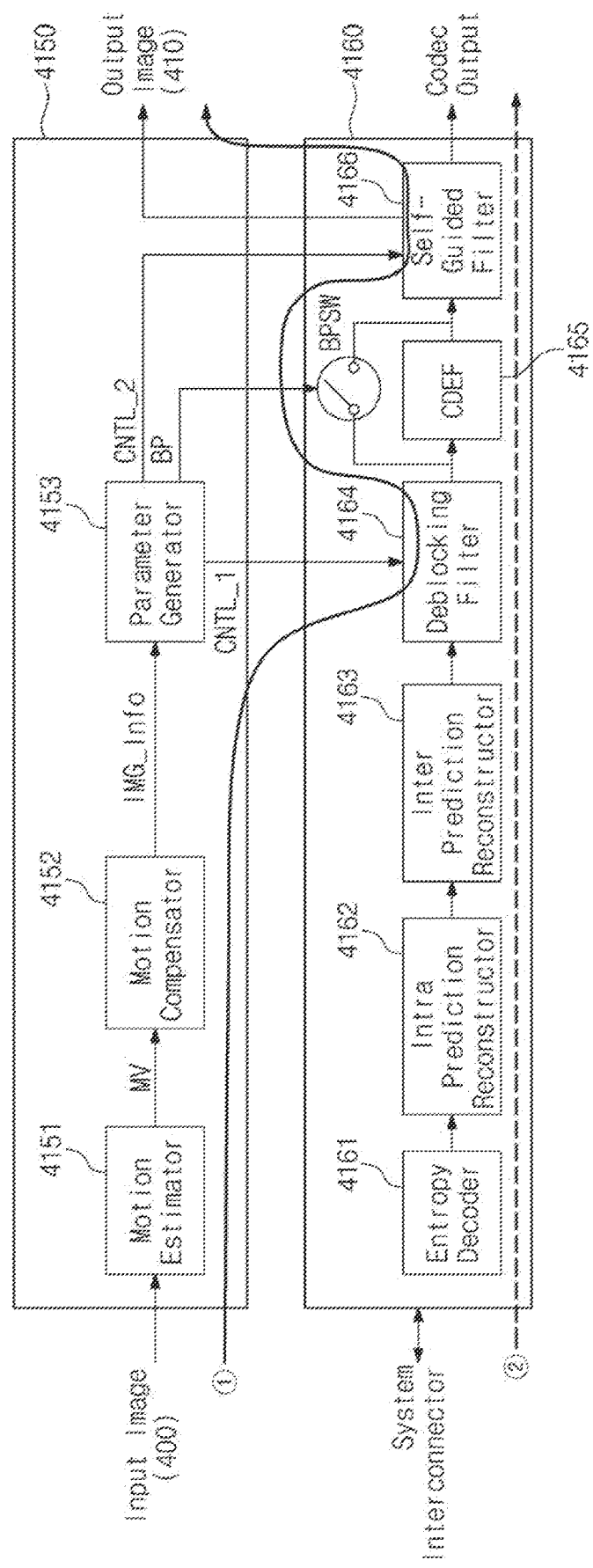
FIG. 13 is a diagram illustrating a configuration of a frame rate converter and a video codec of FIG. 12.

FIG. 13 is a diagram illustrating a configuration of a frame rate converter and a video codec of FIG. 12. Referring to FIG. 13, the frame rate converter 4150 may perform post-processing of a frame rate converting operation by using the deblocking filter 4164 and the self-guided filter 4166 included in the video codec 4160.

The frame rate converter 4150 may include a motion estimator 4151, a motion compensator 4152, and a parameter generator 4153. The video codec 4160 may include an entropy decoder 4161, an intra prediction reconstructor 4162, an inter prediction reconstructor 4163, the deblocking filter 4164, a constrained directional enhancement filter 4165, and the self-guided filter 4166.

Configurations and functions of the frame rate converter 4150 and the video codec 4160 are similar to those of the frame rate converter 1150*a* and the video codec 1150*b* described with reference to FIG. 2. However, the embodiment of FIG. 13 is different from the embodiment of FIG. 2 in that the frame rate converter 4150 and the video codec 4160 are implemented on separated intellectual properties, respectively. A data path of "①" corresponds to the case where the frame rate converter 4150 and the video codec 4160 operate in the FRC mode. For example, in the FRC mode, input image data 400 are output as output image 410 after processing through the motion estimator 2151, the motion compensator 4152, the parameter generator 4153, the deblocking filter 4164, the bypass switch BPSW, and the self-guided filter 4166. In contrast, in the codec mode, data may be processed and output only by the video codec 4160 (refer to a data processing path of ②).

Internal components of the frame rate converter 4150 corresponding to functions of the deblocking filter 4164 and the self-guided filter 4166 included in the video codec 4160 may be removed. Accordingly, by removing overlapping intellectual properties, a circuit or chip area occupied by the frame rate converter 4150 may be reduced, thus making it possible to implement the system-on-chip 4100 with low costs.

Figure 14:
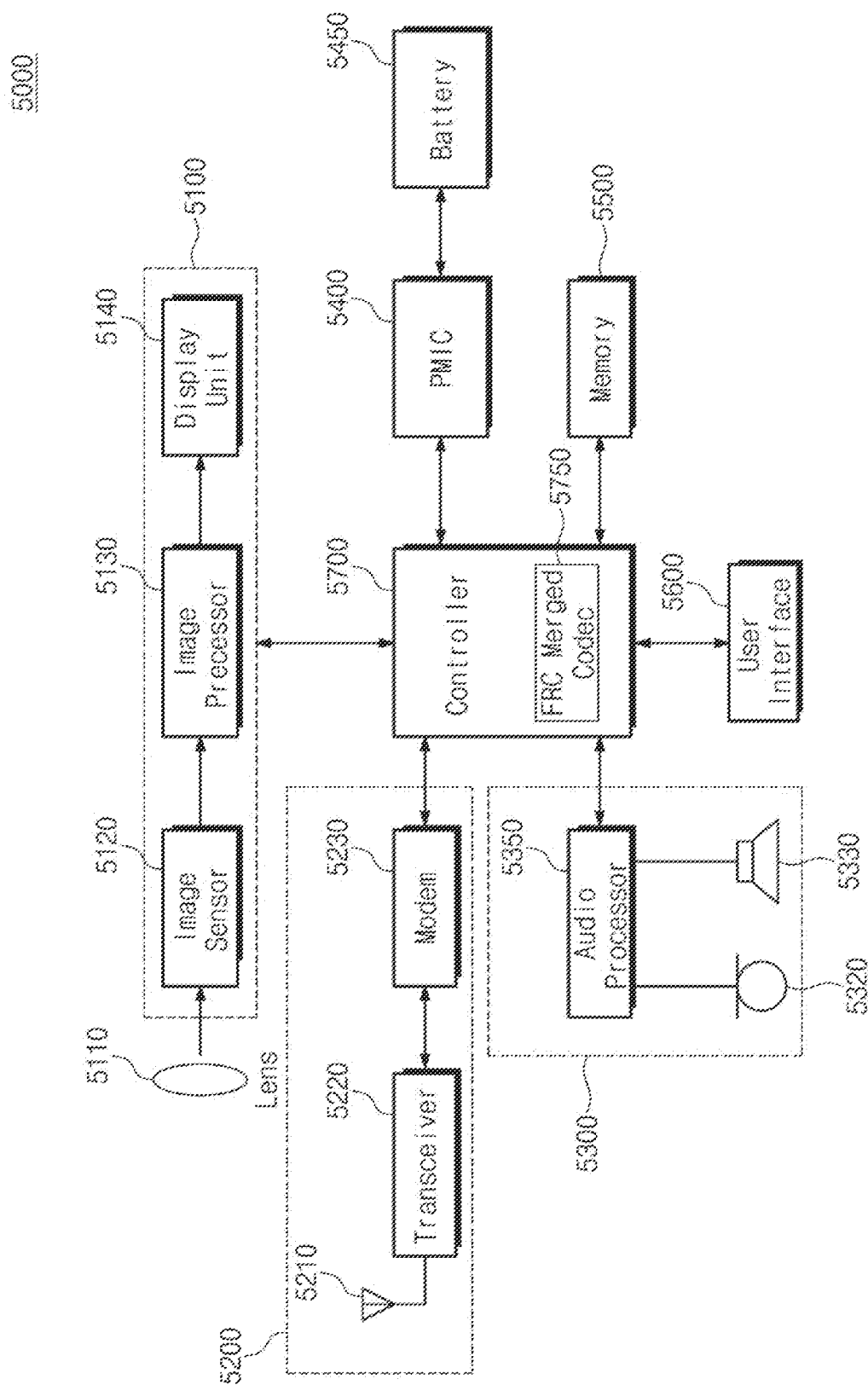
FIG. 14 is a block diagram illustrating a portable terminal including an FRC merged codec, according to an example embodiment of the inventive concept.

FIG. 14 is a block diagram illustrating a portable terminal including an FRC merged codec according to an embodiment of the inventive concept. Referring to FIG. 14, a portable terminal 5000 according to an example embodiment of the inventive concept includes an image processing unit 5100, a wireless transceiver unit 5200, an audio processing unit 5300, a PMIC 5400, a battery 5450, a DRAM 5500, a user interface 5600, and a controller 5700.

The image processing unit 5100 may include a lens 5110, an image sensor 5120, an image processor 5130, and a display unit 5140. The wireless transceiver unit 5200 includes an antenna 5210, a transceiver 5220, and a modulator/demodulator (modem) 5230. The audio processing unit 5300 includes an audio processor 5350, a microphone 5320, and a speaker 5330. The PMIC 5400 may provide a power from the battery 5450 to the controller 5700. The memory 5500 may be used as a working memory of the controller 5700. The user interface 5600 may transfer a user input from an input/output device (not illustrated) to the controller 5700.

In particular, the controller 5700 according to an example embodiment of the inventive concept may include an FRC merged codec 5750. Accordingly, deblocking or unsharp mask filtering for a frame rate converting operation may be processed by using components included in a video codec. A chip size of the controller 5700 which is provided as an application processor (AP) may be reduced through the FRC merged codec 5750. Accordingly, costs necessary to manufacture the portable terminal 5000 including the controller 5700 according to an embodiment of the inventive concept may be reduced.

According to a video codec merged with a frame rate converter, a size of a system-on-chip may be reduced by merging components performing overlapping or similar operations. In this case, since a chip area decreases without reduction of performance, costs necessary to implement the system-on-chip may be reduced.

As is traditional in the field of the disclosed technology, features and embodiments are described, and illustrated in the drawings, in terms of functional blocks and/or units. Those skilled in the art will appreciate that these blocks and/or units are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks and/or units being implemented by microprocessors or similar, they may be programmed using software (e.g., microcode) to perform various functions discussed herein and may optionally be driven by firmware and/or software. Alternatively, each block or unit may be implemented by dedicated hardware, or as a combination of dedicated hardware to perform some functions and a processor (e.g., one or more programmed microprocessors and associated circuitry) to perform other functions.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A system-on-chip comprising:
a processor;
a frame rate converter (FRC) merged codec configured to generate a frame rate converted input image by performing frame rate conversion on an input image in an FRC mode, and to generate an output image by decoding an input bit stream in a codec mode under control of the processor; and
a display controller configured to display the frame rate converted input image or the output image in a display, wherein the FRC merged codec includes:

a frame rate converted configured to perform pre-processing including motion vector calculation and motion compensation of the input image in the FRC mode, and a video codec configured to decode the input bit stream to generate the output image in the codec mode, and wherein the frame rate converter includes a parameter generator configured to generate a parameter for controlling a deblocking filter of the video codec from a result of the pre-processing in the FRC mode.

2. The system-on-chip of claim 1, wherein the video codec is further configured to perform deblocking filtering by using a result of the pre-processing in the FRC mode.

3. The system-on-chip of claim 1, wherein the parameter includes at least one of a filter strength and a number of filter taps of the deblocking filter.

4. The system-on-chip of claim 2, wherein the video codec decodes the input bit stream to the output image in compliance with an AV1 standard.

5. A system-on-chip comprising:

a processor;

a frame rate converter configured to generate a frame rate converted input image by performing frame rate conversion on an input image under control of the processor; and a video codec configured to generate an output image by decoding an input bit stream in a codec mode under control of the processor, wherein the video codec includes at least one of a deblocking filter and a self-guided filter, and wherein the frame rate converter uses the at least one of the deblocking filter and the self-guided filter included in the video codec to generate the frame rate converted input image.

6. The system-on-chip of claim 5, wherein the frame rate converter includes a parameter generator configured to generate a parameter for controlling the deblocking filter of the video codec, and wherein the parameter includes at least one of a filter strength and a number of filter taps of the deblocking filter.

7. The system-on-chip of claim 5, wherein the video codec further includes:

a constrained directional enhancement filter configured to remove a noise along an edge of an image corresponding to an output of the deblocking filter and to output a result of removing the noise as an output of the constrained directional enhancement filter;

a self-guided filter configured to perform edge preserving filtering on the output of the deblocking filter or the output of the constrained directional enhancement filter; and a bypass switch configured to bypass the output of the deblocking filter to the self-guided filter under control of the parameter generator.

8. The system-on-chip of claim 7, wherein the bypass switch is configured to be turned on when the video codec operates in a frame rate converting mode.

9. The system-on-chip of claim 5, further comprising:

an unsharp mask filter configured to enhance an edge of an image filtered by the deblocking filter.

* * * * *